April 23, 1968  E. L. WARREN  3,378,937
TEACHING DEVICE

Filed April 29, 1966  7 Sheets-Sheet 1

INVENTOR.
EDWARD L. WARREN
BY

ATTORNEY

April 23, 1968    E. L. WARREN    3,378,937
TEACHING DEVICE
Filed April 29, 1966    7 Sheets-Sheet 2

INVENTOR.
EDWARD L. WARREN
BY *McHenry Farrington,*
*Pearne & Gordon*

ATTORNEY

April 23, 1968  E. L. WARREN  3,378,937
TEACHING DEVICE

Filed April 29, 1966  7 Sheets-Sheet 3

INVENTOR.
EDWARD L. WARREN
BY
ATTORNEY

April 23, 1968

E. L. WARREN 3,378,937

TEACHING DEVICE

Filed April 29, 1966

INVENTOR.
EDWARD L. WARREN

BY

ATTORNEY

April 23, 1968     E. L. WARREN     3,378,937
TEACHING DEVICE

Filed April 29, 1966     7 Sheets-Sheet 5

INVENTOR.
EDWARD L. WARREN
BY

ATTORNEY

April 23, 1968

E. L. WARREN 3,378,937

TEACHING DEVICE

Filed April 29, 1966

INVENTOR.
EDWARD L. WARREN
BY

ATTORNEY

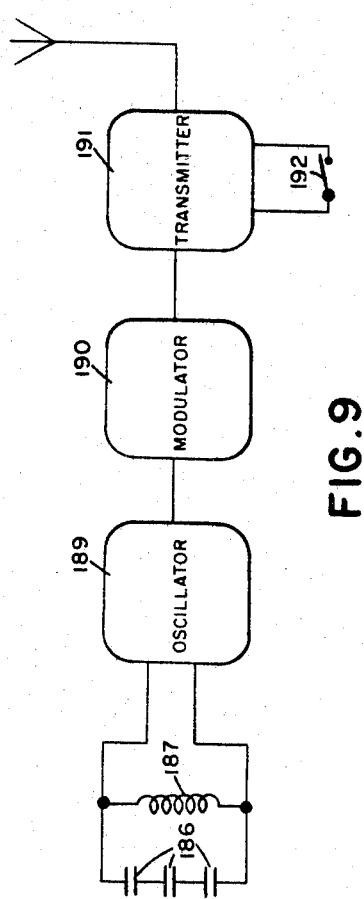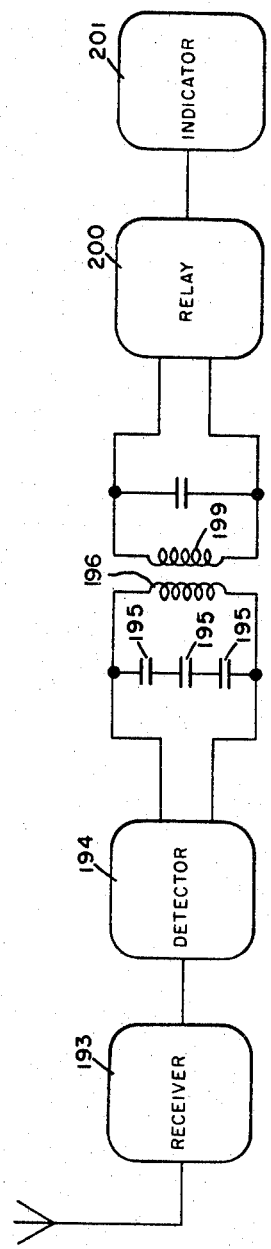

United States Patent Office 3,378,937
Patented Apr. 23, 1968

3,378,937
TEACHING DEVICE
Edward L. Warren, 6333 Stafford Drive,
North Olmsted, Ohio 44070
Filed Apr. 29, 1966, Ser. No. 546,271
9 Claims. (Cl. 35—9)

ABSTRACT OF THE DISCLOSURE

A device for indicating the correctness of programmed answers which includes a master control panel having a plurality of settings for selecting a corresponding plurality of programmed answers. The device further includes a student's module having a corresponding plurality of settings for indicating selected answers to the programmed questions. The master control panel has a frequency generating means which generates a unique signal for each setting of the master control panel. A correct answer is indicated in response to the generated frequency of the master control panel when the settings of the master control panel and the student's module correspond.

---

This invention relates to teaching devices and, more particularly, to teaching devices having a master control panel which may be programmed by the instructor with correct answers and having one or more student modules which will indicate correct answers at the student's module, at the master control panel, and/or at a remote display panel when the student or students program their modules with correct answers.

Heretofore, teaching devices have included a master control panel and one or more student modules, and correct answers are indicated when the instructor closes a switch on his master control panel and the student, in response to a question, closes a switch on his module which is in a circuit with the instructor's closed switch. In order to prevent the student from indicating a correct answer by closing all of his switches, complex switching circuits have been proposed to prevent the indication of a correct answer when more than one switch is closed in a student's module. Such arrangements, however, are complex and may necessitate unwieldly wiring connections between the master control panel and the students' modules and such wiring connections may be unsafe in the classroom.

It is an object of the present invention to overcome many of the deficiencies of the prior art.

It is a more specific object of this invention to provide a teaching device which includes a master control panel which may be programmed with the correct answer to a question posed by the teacher and includes at least one student's module which, when programmed to the correct answer by the instructor, will indicate the correctness of the answer on the master control panel, on the student's module, and/or on a remote indicating panel.

According to one aspect of this invention, the master control panel includes a frequency generating means which may have its frequency varied by the instructor and a second frequency generating means which transmits a fixed frequency. These frequencies are mixed and then filtered so that only the sum of the two frequencies, or only the difference between the two frequencies, is passed through the filter. The algebraic sum of these frequencies is transmitted to each student's console. Each student's console includes a frequency generating means which may have its frequency varied by the student. The frequency output of the student's generating means is mixed with the frequency which passes through the filter at the instructor's master control panel. If the student has matched the frequency output of the instructor's frequency generating means, a correct answer will be indicated.

According to a further aspect of this invention, a teaching device is provided which includes a master control panel having a frequency generating means having a variable frequency output which is transmitted to the students' consoles. Each of the students' consoles includes tuned circuits which will resonate at the oscillator frequency when a student has indicated a correct answer to thereby tune his circuit to the oscillator frequency. When a correct answer has been made in this manner, a correct answer will be indicated.

These and other objects, features, and advantages of the invention will become more apparent and more fully understood from the following detailed description of the invention and the accompanying drawings, in which:

FIG. 9 is a schematic wiring diagram of the master control panel illustrated in FIG. 4; and FIG. 10 is a schematic wiring diagram of each student's module illustrated in FIG. 4.

Figure 1:
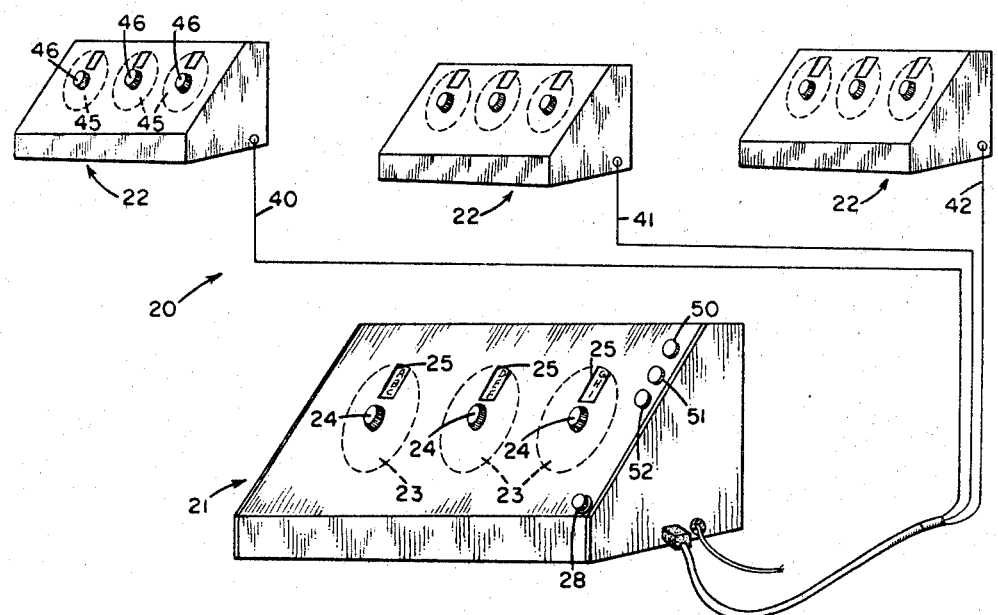
FIG. 1 is a perspective view of a master control panel and the students' modules according to one aspect of this invention.
Figure 5:
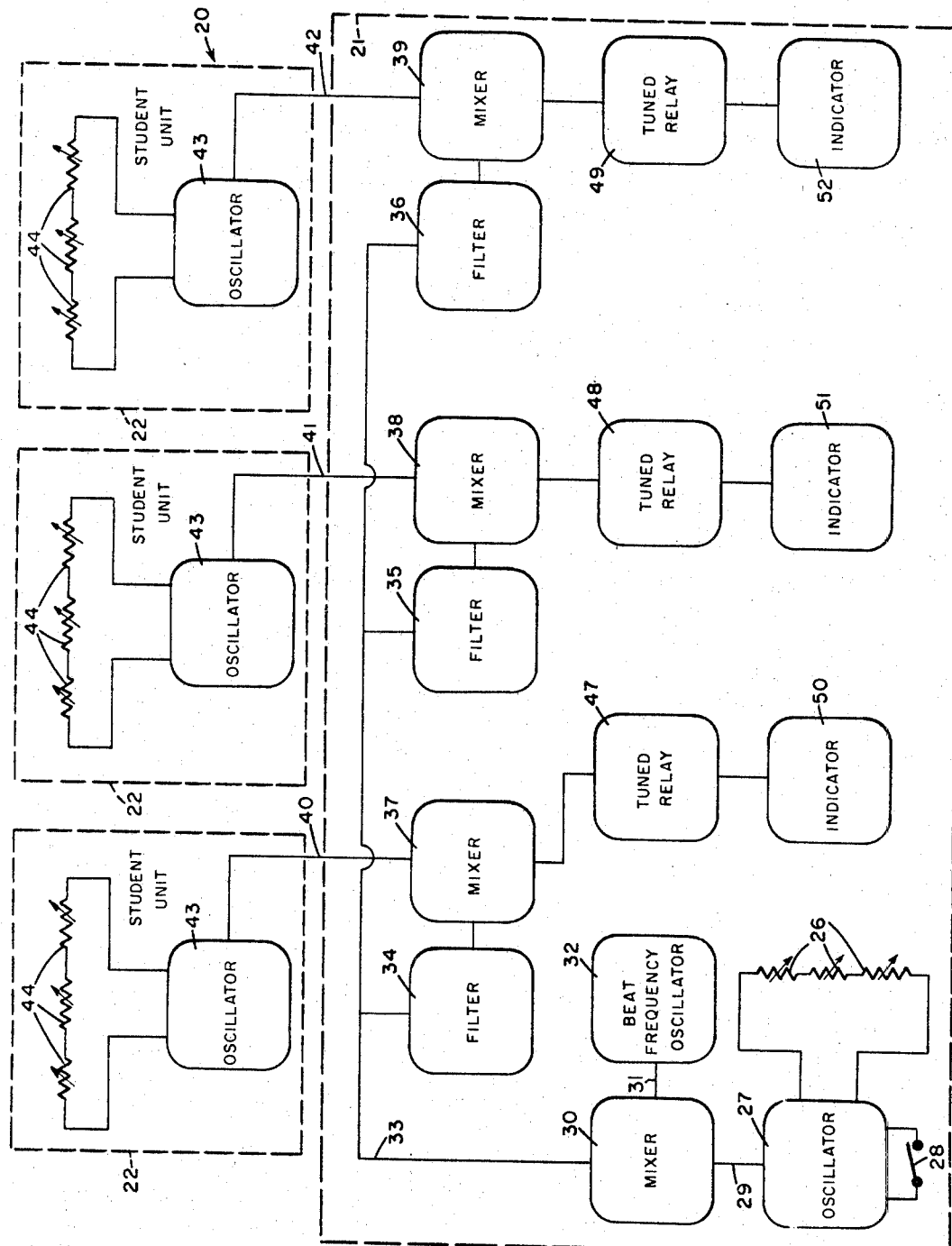
FIG. 5 is a schematic wiring diagram of the master control panel and students' modules illustrated in FIG. 1.

Referring now to the drawings, and particularly to FIGS. 1 and 5, a teaching device 20 according to one aspect of this invention is illustrated. The teaching device 20 includes a master control panel 21 and a plurality of students' modules 22. The master control panel 21 is positioned at the instructor's desk and a student module 22 is positioned at each student's desk.

The master control panel 21 includes a number of answer programming dials 23, each of which is rotatably operated by its own setting knob 24, which projects from the front face of the control panel 21. Each programming dial 23 comprises a circular disk having, for example, letters which are radially grouped on its face. The letters may be grouped in sets of three, similar to the grouping on the face of a telephone dial, and each grouping may successively be visible through an aperture 25 in the face of the master control panel 21.

The master control panel 21 may be programmed for a correct answer by setting the knobs 24 so that the apertures 25 indicate, for example, a correctly spelled word. It will be apparent that the number of programming dials 23 may be varied and indicia other than letters may be inscribed on the faces of the dials. Moreover, the letters may be grouped differently and only a single letter may appear on a single dial, if desired.

Each programming dial 23 is connected to one of a plurality of variable resistors 26 (FIG. 5). The variable resistors 26 are connected in series to an oscillator 27.

The oscillator 27 has a frequency output which may be varied as a function of the resistance across the variable resistors 26. Therefore, the frequency output of the oscillator 27 varies according to the particular setting of the programming disks 23. After the instructor has selected a correct answer to the question presented to the students, the instructor adjusts the programming disks 23 to indicate that correct answer, thereby adjusting the variable resistors 26 and the frequency output of the oscillator 27. The instructor then closes a switch 28 on the oscillator 27 and the oscillator 27 emits a tone having a frequency corresponding to the frequency selected by the instructor. This tone is transmitted by a connection 29 to a mixer 30.

The mixer 30 receives a second tone by way of a connection 31 from a beat frequency oscillator 32 which is pretuned to a fixed frequency. The mixer 30 emits a tone over a line 33 which contains the frequencies of the oscillator 27, the beat frequency oscillator 32, the sum of these two frequencies, and the difference between these two frequencies.

This tone is transmitted to filters 34, 35, and 36. The filters 34–36 are each designed to pass the sum of the frequencies of the oscillator 27 and the beat frequency oscillator 32 and to block the frequency of the oscillator 27, the frequency of the beat frequency oscillator 32, and the difference between these two frequencies. If desired, the filters 34–36 may be designed to pass the difference between the frequencies of oscillator 27 and the beat frequency oscillator 32 and to block the frequency of the oscillator 27, the frequency of the beat frequency oscillator 32, and the sum of these two frequencies. Thus, the filters 34–36 are designed to pass the algebraic sum of the frequency of the oscillator 27 and the beat frequency oscillator 32.

The alegbraic sum of the frequencies of the oscillator 27 and the beat frequency oscillator 32 is transmitted from each filter 34–36 to mixers 37, 38, and 39, respectively. The mixers 37–39 are each connected to one of the students' modules 22 by lines 40, 41, and 42 respectively.

Each student module 22 is identical to the other student modules and comprises an oscillator 43. Each oscillator 43 may have its frequency output varied by varying the resistance of one or more variable resistors 44, which are connected in series to each oscillator 43. Each variable resistor 44 is connected to its own one of a plurality of answer indicating disks 45 in each module 22. Each answer indicating disk 45 has indicia on its front face which may comprise letters radially arranged in the same manner as the radially arranged letters in the teacher's console 21. After the instructor has presented his question and has programmed the master control panel 21 to indicate the correct answer to his question, a student will adjust his answer indicating disks 45 to what that student believes the correct answer to be by adjusting knobs 46 which are connected to the disk 45 and which project through the front face of the student's module 22. Each oscillator 43 corresponds precisely to the oscillator 27 so that the student's oscillator 43 will emit the same frequency as that frequency emitted by the oscillator 27 if the student has selected the correct answer. The frequency emitted from an oscillator 43 is transmitted to one of the mixers 37–39, where it is mixed with the sum of the frequencies from the oscillator 27 and the beat frequency oscillator 32. Each mixer 37–39 transmits a tone to one of a plurality of tuned relays 47, 48, and 49, respectively. The tone transmitted by a mixer 37–39 to a tuned relay 47–49 comprises the frequency of its oscillator 43, the frequency that is passed through its filter 34–36 (the algebraic sum of the frequency of the oscillator 27 and the frequency of the beat frequency oscillator 32), and the difference between the two frequencies.

If the student has selected the correct answer so that his oscillator 43 emits a tone which corresponds to the tone emitted by the oscillator 27, these tones are cancelled by the mixer 37–39 so that when a correct answer is indicated, the tone of the beat frequency oscillator 32 will be the only frequency transmitted to a tuned relay 47–49. All of the tuned relays 47–49 are tuned to the frequency of the beat frequency oscillator so that they vibrate at that particular frequency. When a tuned relay 47–49 receives the beat frequency oscillator frequency, an indicating means 50, 51, and 52 will indicate a correct answer. Each indicating means 50–52 may comprise a signal light mounted on the master control panel, on each student's module 22, or on a remote indicating board. When a tuned relay 47–49 is vibrated by the frequency of the beat frequency oscillator 32, a circuit is completed to energize the indicator 50–52.

Figure 2:
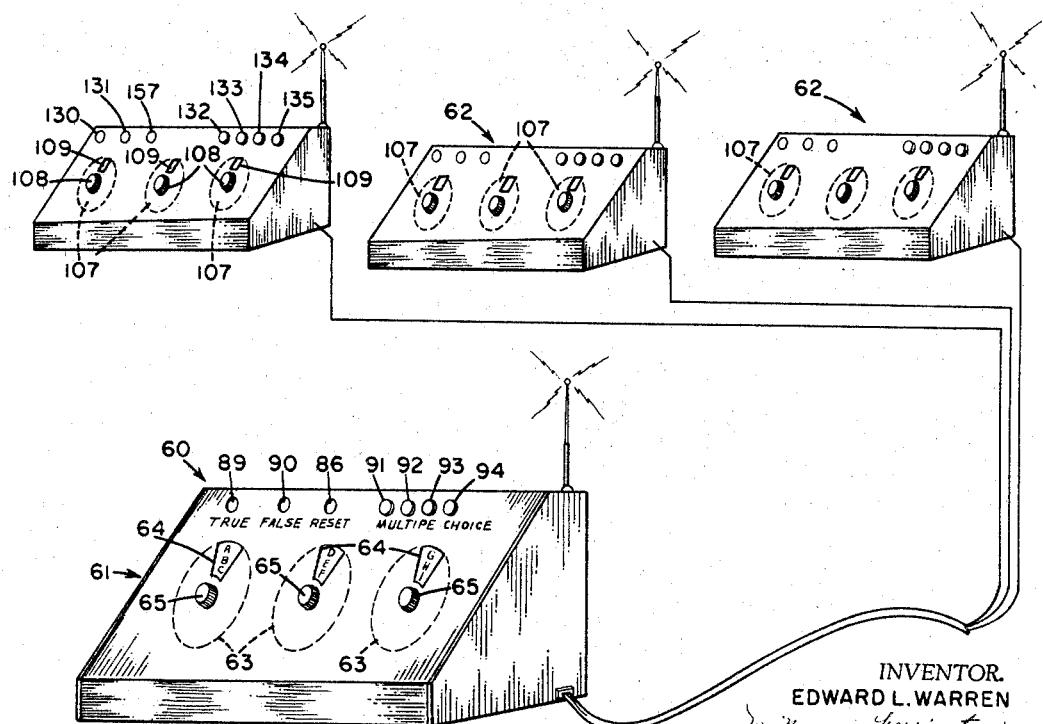
FIG. 2 is a perspective view of a master control panel and the students' modules according to another aspect of this invention.
Figure 6:
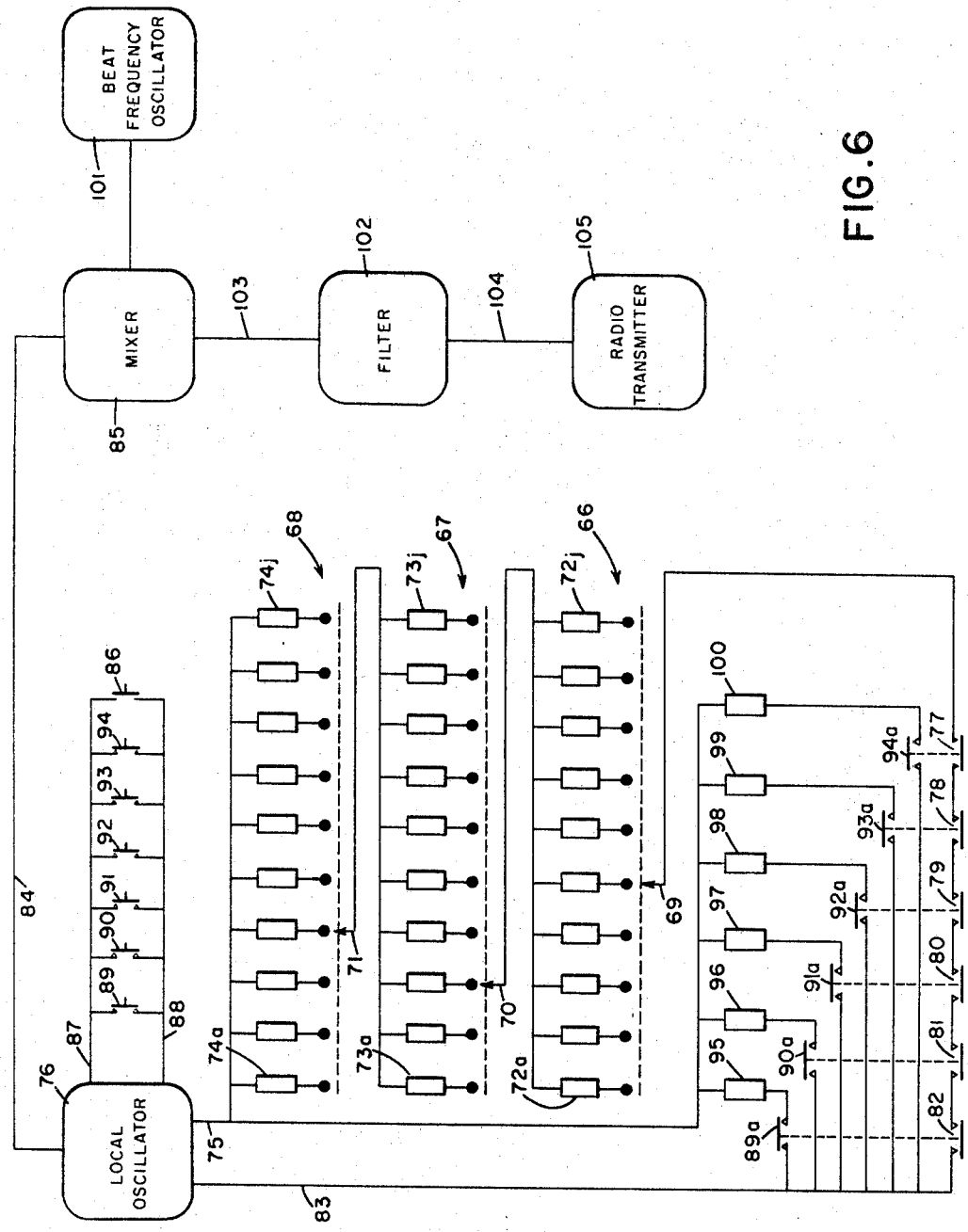
FIG. 6 is a schematic wiring diagram of the master control panel illustrated in FIG. 2.
Figure 7:
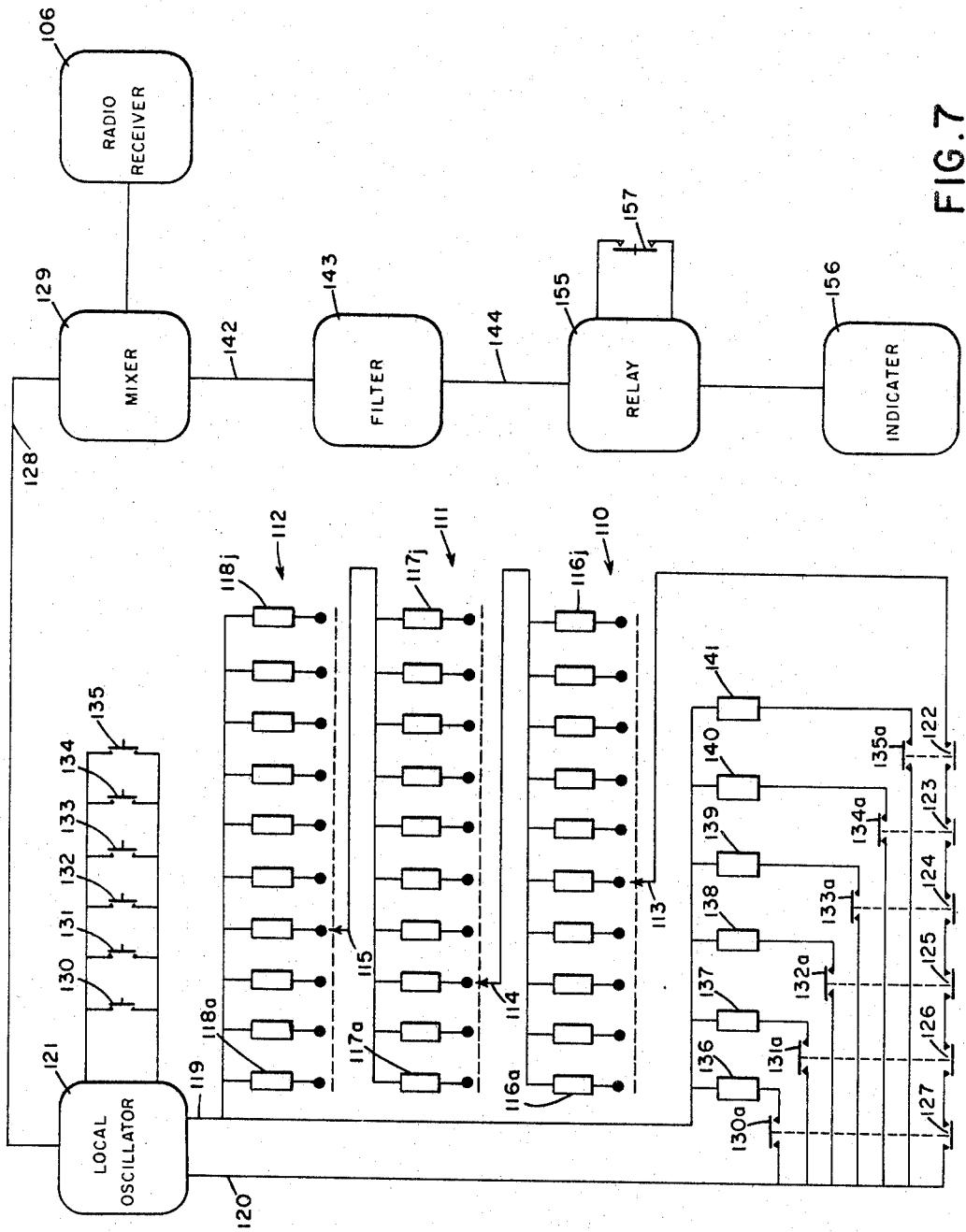
FIG. 7 is a schematic wiring diagram of each of the students' consoles illustrated in FIG. 2.

Referring now to FIGS. 2, 6, and 7, a teaching device 60 according to a further aspect of this invention is illustrated. The teaching device 60 includes a master control panel 61 and a plurality of student modules 62.

The master control panel 61 includes a plurality of programming disks 63. Each programming disk 63 is provided with indicia such as letters on its front face. The letters may be radially arranged in groups of three, similar to the grouping on a telephone dial. If desired, numerals or other indicia may be provided on the front face of each programming disk 63. The front face of the master control panel 61 is provided with apertures 64 so that portions of the indicia are exposed when each programming disk 63 is rotatably adjusted by its own control knob 65. Each programming disk 63 is respectively connected to one of a plurality of sliding contact switches 66, 67, and 68. The sliding contact switches 66–68 include a slidable contact 69, 70, and 71, respectively (the position of which may be varied by a programming disk 63), and a multiplicity of resistors $72_a$–$72_j$, $73_a$–$73_j$, and $74_a$–$74_j$, respectively. Each resistor $74_a$–$74_j$ has a different resistance so that a unique total resistance may be produced for each setting of the slidable contacts 69–71.

If the instructor wishes to present a question which has an answer which requires a group of indicia, he adjusts the knobs 65 until the programming disks 63 indicate the desired answer. Each of the slidable contacts 69–71 will thereby be set at a particular resistance to produce a unique total resistance between a line 75 and the slidable contact 69. This unique total resistance is put in series with a local oscillator 76 through the slidable contact 69, normally closed contacts 77, 78, 79, 80, 81, 82, and a line 83. Each possible setting of the slidable contacts 69–71 produces a different total resistance between the lines 75 and 83 and, therefore, a different frequency of oscillation of the local oscillator 76. The frequency output of the local oscillator 76 is transmitted by a line 84 to a mixer 85 when a normally open switch 86 is closed. The normally open switch 86 is located on the front face of the master control panel and completes a circuit between a line 87 and line 88. The local oscillator 76 will emit its frequency signal to the mixer 85 only when the lines 87 and 88 are in circuit with the local oscillator.

The teaching device 60 is also provided with means to indicate a true or false statement and means to indicate the correct answer to a multiple choice question. If the instructor asks a true-false type question, he programs the master control panel to indicate that the statement is true or false by closing a switch 89 or 90, respectively. Closure of the switch 89 also closes a normally open switch $89_a$ and simultaneously opens the normally closed switch 82. Closure of the switch 89 permits the local oscillator 76 to emit a frequency over the line 84 to the mixer 85. Closure of the switch $89_a$ connects a resistor 95 to the local oscillator 76 and the simultaneous opening of the switch 82 disconnects any resistor $72_a$–$74_j$ that would otherwise be in series with the local oscillator 76. Thus, closure of the switch 89 places only the resistance of the resistor 95 in circuit with the local oscillator 76 so that the local oscillator 76 emits a frequency that is solely dependent upon the resistance of the resistor 95.

If the instructor wishes to indicate that a statement is true, he closes the switch 90. The closure of the switch 90 simultaneously closes a normally open switch $90_a$ and opens the normally closed switch 81 to place a resistor 96 in circuit with the local oscillator 76.

An answer to a multiple choice question may be programmed in a similar manner by closing one of a plurality of switches 91, 92, 93, or 94. The closure of one of the switches 91–94 permits the local oscillator 76 to send its signal to the mixer 85 and the closure of the switches 91–94 respectively closes a corresponding normally open switch $91_a$, $92_a$, $93_a$, or $94_a$, and opens the corresponding normally closed switch 80, 79, 78, or 77.

The closure of one of the switches 91–94, therefore, connects a resistor 97, 98, 99, or 100, respectively, to the local oscillator 76. Since each resistor $72_a$–$74_j$ and 95–100 has its own resistance value, the local oscillator will emit a different frequency depending upon which resistor or group of resistors are connected to the local oscillator 76.

The particular frequency emitted by the local oscillator 76 is transmitted over the line 84 to the mixer 85, where it is mixed with a predetermined and constant frequency signal from a beat frequency oscillator 101. The mixer emits an intermediate signal that contains the frequencies of the local oscillator 76, the beat frequency oscillator 101, the sum of these two frequencies, and the difference between these two frequencies. This intermediate frequency is transmitted from the mixer 85 to a filter 102 over a line 103. The filter 102 presents a high impedance to the frequencies of the local oscillator 76, the beat frequency oscillator 101, and the difference between these two frequencies. Therefore, the frequency which is the sum of the frequency of the local oscillator 76 and the beat frequency oscillator 101 is passed through the filter 102 over a line 104 to a conventional radio transmitter 105. The radio transmitter 105 thereupon transmits this signal to each student module 62. If desired, the filter 102 may present a high impedance to the frequencies of the local oscillator 76, the beat frequency oscillator 101, and the sum of these two frequencies and pass the difference between the frequencies to the transmitter 105.

Each student module 62 includes a conventional radio receiver 106 (FIG. 7) which receives the signal from the master control panel 61. Each student's module includes a multiplicity of answer indicating disks 107, which are provided with indicia on their faces which is similar to the indicia provided on the programming disks 63. Each answer indicating disk 107 may be rotatably adjusted by a knob 108 so that different indicia appear in apertures 109 which are cut in the front face of each module 62.

Each disk 107 is connected to one of a plurality of selector switches 110, 111, and 112. Each selector switch 110–112 includes a sliding contact 113, 114, and 115, each of which is respectively connected to one of the disks 107. By rotating the disks 107, the sliding contacts 113–115 respectively contact one of a series of resistors $116_a$–$116_j$, $117_a$–$117_j$, and $118_a$–$118_j$.

Each resistor $116_a$–$118_j$ has a resistance value which respectively corresponds to the resistance value of each corresponding resistor $72_a$–$74_j$ in the instructor's master control panel 61 so that identical disks settings on the master control panel 61 and a student's module 61 will place identical resistance values in series. The selected resistance in the student's module 62 is applied across a lead 119 and a lead 120 of a local oscillator 121 through normally closed switches 122, 123, 124, 125, 126, and 127. Each setting of the answer indicating disks 107 produces a unique total resistance over the leads 119 and 120, and each unique total resistance applied to the local oscillator 121 causes the oscillator 121 to emit a unique frequency over a line 128 to a mixer 129.

If the instructor has presented a true-false type question to the student, the student closes either a true switch 130 or a false switch 131. The closure of the switch 130 simultaneously closes a normally open switch $130_a$ and opens the normally closed switch 127 to connect a resistor 136 to the local oscillator 121 and simultaneously disconnects the resistors $116_a$–$118_j$ from the circuit. The closure of the switch 131 closes a normally open switch $131_a$ and opens the normally closed switch 126 to connect a resistor 137 to the local oscillator 121 and simultaneosuly disconnect the resistors $116_a$–$118_j$ from the circuit.

If the instructor asks a multiple-choice type question, the student selects one of a plurality of switches 132, 133, 134, and 135 to indicate the correct answer. The closure of the switch 132 simultaneously closes a normally open switch $132_a$ and opens the normally closed switch 125 to connect a resistor 138 to the local oscillator 121 and disconnect the resistors $116_a$–$118_j$ from the circuit. The closure of the switch 133 simultaneously closes a normally open switch $133_a$ and opens the normally closed switch 124 to connect a resistor 139 to the local oscillator 121 and disconnect the resistors $116_a$–$118_j$ from the circuit. The closure of the switch 134 simultaneously closes a normally open switch $134_a$ and opens the normally closed switch 133 to connect a resistor 140 to the local oscillator and simultaneously disconnect the resistors $116_a$–$118_j$ from the circuit. The closure of the switch 135 simultaneously closes a normally open switch $135_a$ and opens the normally closed switch 122 to connect a resistor 141 to the local oscillator and disconnect the resistors $116_a$–$118_j$ from the circuit.

Each of the resistors 136–141 has a unique resistance value which corresponds respectively to the resistance value of the resistors 95–100 in the master control panel so that the local oscillator 76 in the master control panel and the local oscillator 121 in a student's module 62 will emit identical frequencies when the student matches the setting programmed by the instructor. Thus, if the student has indicated the correct answer in his module, identical frequencies will be transmitted to the mixer 85 on the one hand and the mixer 129 on the other hand.

The frequency received by the radio receiver 106 is mixed with the frequency emitted by the local oscillator 121. This results in an intermediate signal that contains the frequencies of the local oscillator 121, the frequency received by the radio receiver 106, the sum of these two frequencies, and the difference between these two frequencies. This intermediate frequency is transmitted by the mixer 129 over a line 142 to a filter 143. The filter 143 presents a high impedance to all frequencies except that of the beat frequency oscillator 101 in the master control panel 61. If the signal from the local oscillator 121 is the same as the signal from the local oscillator 76 in the master control panel 61, the intermediate frequency which is passed through the filter 143 will correspond precisely to the frequency of the beat frequency oscillator 101. If the student has selected the correct answer, the beat frequency oscillator frequency will be transmitted along a line 144 and operate a relay 155. Closure of the relay 155 energizes an indicator light 156 on the student's module. After a correct answer has been indicated on the student's module 62, the student resets his circuit by opening a normally closed reset switch 157 to de-energize the relay 155.

Figure 3:
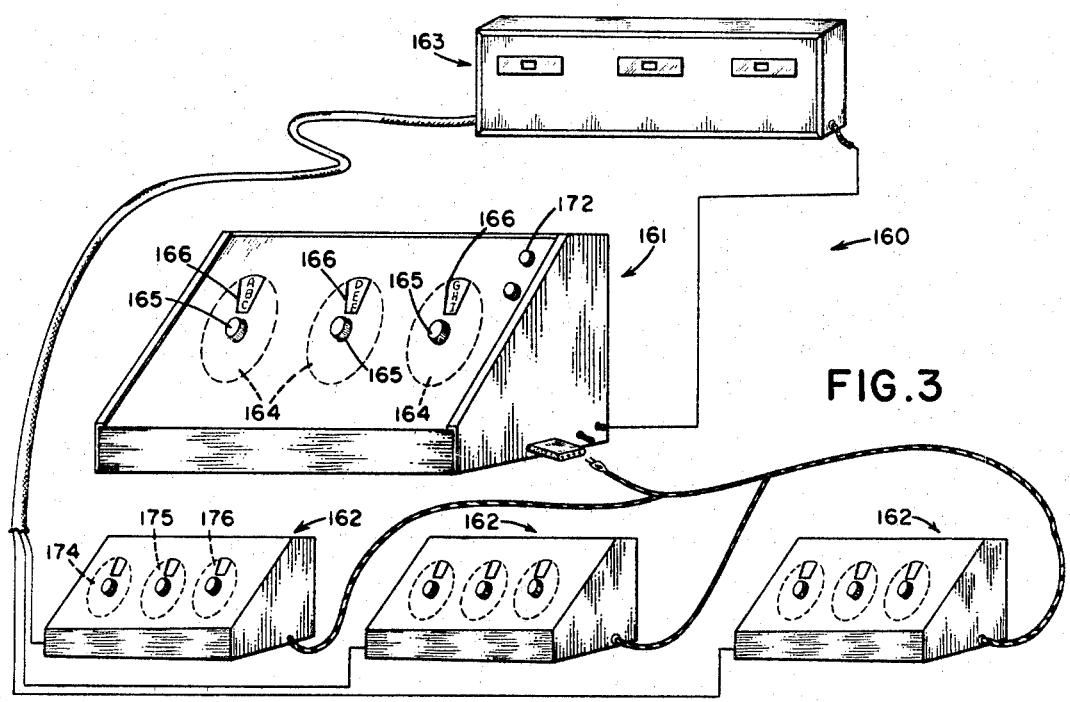
FIG. 3 is a perspective view of a master control panel, the students' modules, and a remote indicating board according to a further aspect of this invention.
Figure 8:
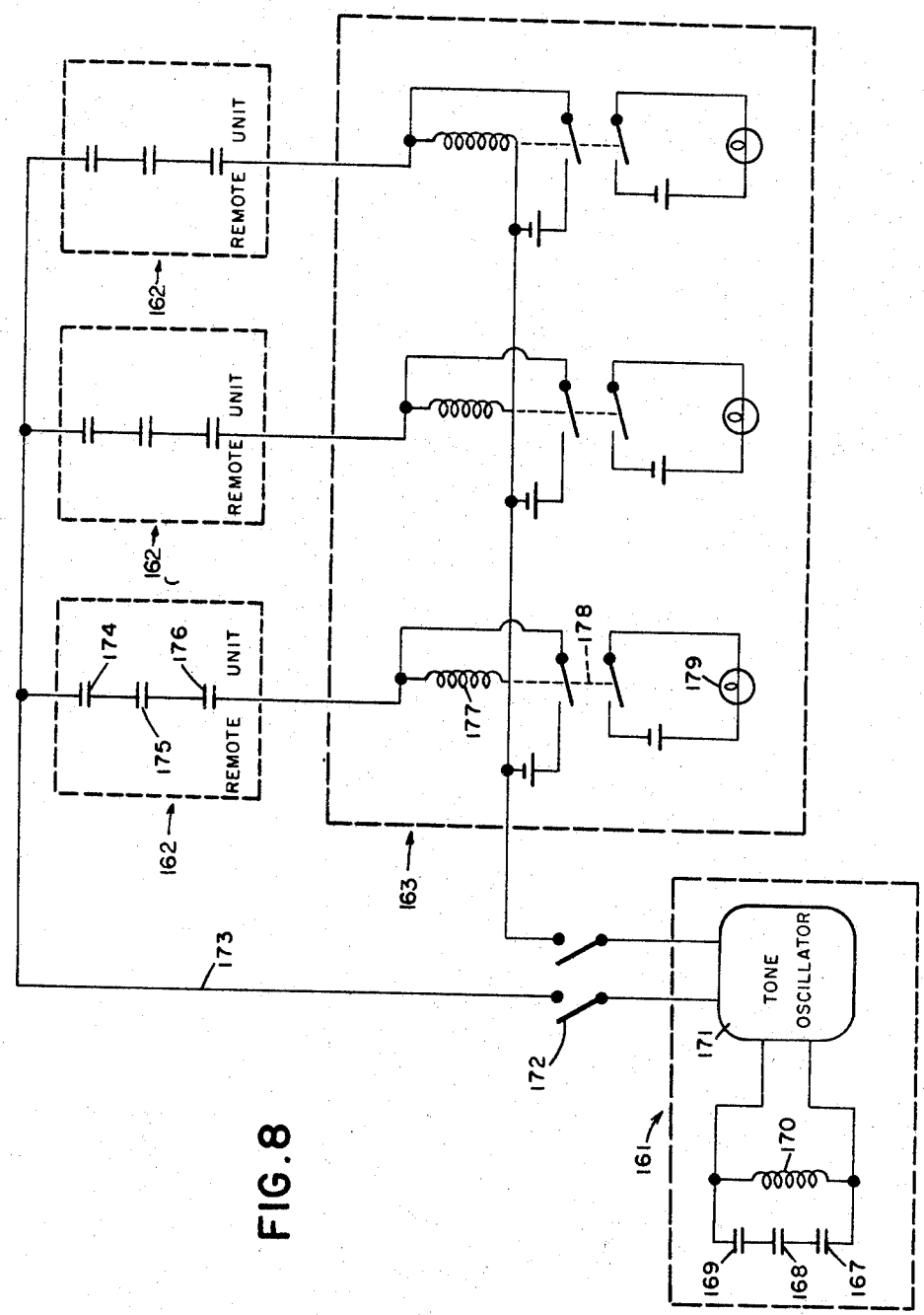
FIG. 8 is a schematic wiring diagram of the master control panel and the students' consoles illustrated in FIG. 3.

Referring now to FIGS. 3 and 8, a teaching device 160 according to a further aspect of this invention is illustrated. The teaching device 160 includes a master control panel 161, a plurality of students' modules 162, and a remote indicating board 163. The master control panel 161 is positioned at the instructor's desk and a student module 162 is positioned at each student's desk. The remote indicating device 163 may be mounted so that it is clearly visible to the instructor and to each student.

The master control panel 161 includes a number of answer programming dials 164, each of which is rotatably operated by its own setting knob 165, which projects from the front face of the control panel 161. Each programming dial 164 comprises a circular disk having, for example, letters which are radially grouped on its face. The letters may be grouped in sets of threes, similar to the grouping on the face of a telephone dial, and each grouping may successively be visible through an aperture 166 in the face of the master control panel 161.

The master control panel 161 may be programmed for a correct answer by setting the knobs 165 so that the apertures 166 indicate, for example, a correctly spelled word. It will be apparent that the number of programming dials 164 may be varied and indicia other than letters may be inscribed on the faces of the dials. Moreover, the letters may be grouped differently, and only a single letter may appear at an aperture 166, if desired.

Each programming dial 164 is connected to one of a plurality of variable capacitors 167, 168, and 169. The capacitors 167–169 and a coil 170 form a tuned circuit which controls the frequency of an oscillator 171.

After the instructor has set his disks 164 to indicate a correct answer, he closes a switch 172 and the signal generated by the oscillator 171 is transmitted to each student's module 162 over a line 173.

Each student's module 162 comprises a set of variable capacitors 174, 175, and 176, which are respectively identical to the capacitors 167–169 in the master control panel 161. Each of the group of capacitors 174–176 in each module 162 is connected in series to its own relay coil 177 in the display panel 163. The capacitors 174–176 and the relay coil 177 form a tuned circuit. Each relay coil 177 has the same inductance as each other relay coil 177 and, therefore, the tuned circuit formed by the capacitors of each student module and their relay will resonate at the frequency of the oscillator 171 when the student selects the right answer. If a student has selected the same answer as that programmed by the instructor, and therefore the student's capacitors 174–176 correspond to the programmed capacitor setting in the master control panel, the student's module 162 will be tuned to the same frequency as the frequency generated by the oscillator 171. The student's module, therefore, will offer little impedance to current flow through the coil 177 and normally open switches 178 will be closed and a light signal 179 will indicate a correct answer on the remote indicating board.

Figure 4:
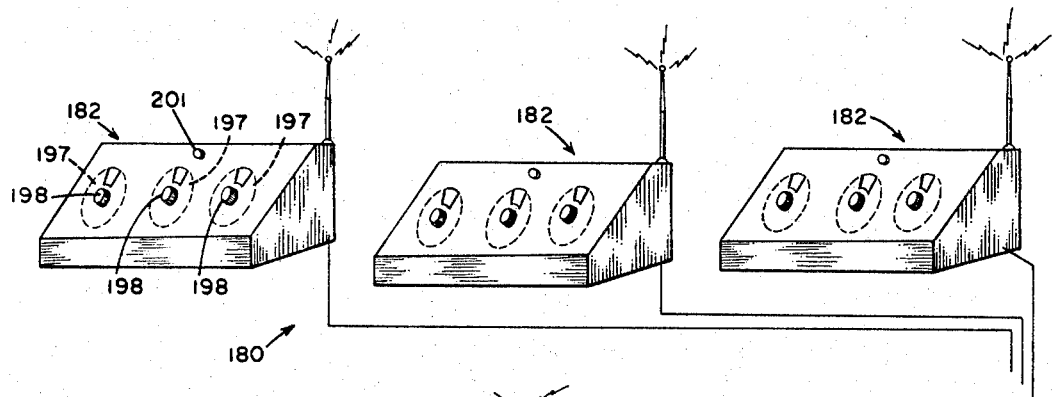
FIG. 4 is a perspective view of a master control panel and the students' modules according to a still further aspect of this invention.
Figure 4:
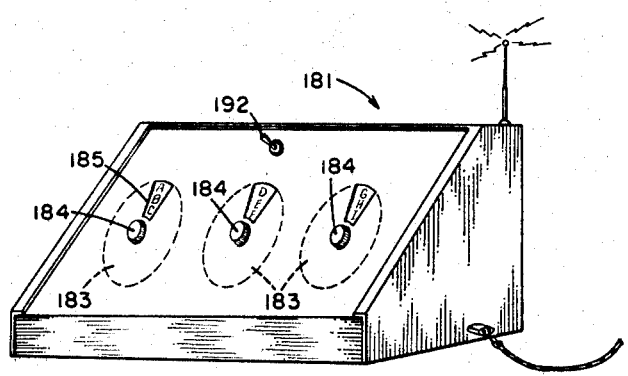

Referring now to FIGS. 4, 9, and 10, a teaching device 180 according to a further aspect of this invention is illustrated. The teaching device 180 includes a master control panel 181 and a plurality of students' modules 182.

The master control panel 181 includes a number of answer programming dials 183, each of which is rotatably operated by its own setting knob 184, which projects from the front face of the control panel 181. Each programming dial 183 comprises a circular disk having, for example, letters which are radially grouped on its face. The letters may be grouped in sets of three, similar to the grouping on the face of a telephone dial, and each grouping may successively be visible through an aperture 185 in the face of the master control panel 181.

The master control panel 181 may be programmed for a correct answer by setting the knobs 184 so that the apertures 185 indicate, for example, a correctly spelled word. It will be apparent that the number of programming dials 183 may be varied and indicia other than letters may be inscribed on the faces of the dials. Moreover, the letters may be grouped differently and only a single letter may appear on a single dial, if desired.

Each programming dial 183 is connected to one of a plurality of variable capacitors 186 (FIG. 9). The variable capacitors 186 form a tuned circuit with a coil 187 and this tuned circuit determines the frequency output of an oscillator 189.

The signal output of the oscillator 189 is modulated by a modulator 190 and is sent to each student's module by a conventional transmitter 191. This transmission occurs when the instructor closes a switch 192 on the master control panel 181.

Each student module 182 is identical with the other student modules and includes a receiver 193 which receives the signal transmitted by the master control panel 181. The received signal is detected by a detector 194 and the detected frequency is applied to a tuned circuit which comprises a plurality of variable capacitors 195 and a primary coil 196. Each variable capacitor 195 is connected to its own one of a plurality of answer-indicating disks 197 in each module 182. Each answer-indicating disk 197 has indicia on its front face which may comprise letters radially arranged in the same manner as the radially arranged letters in the master control panel 181. After the instructor has presented his question and has programmed the master control panel 181 to indicate the correct answer to his question, a student will adjust his answer-indicating disk 197 to what he believes the correct answer to be by adjusting knobs 198 which are connected to each disk 197 and which project through the front face of the student's module 182.

If the student has selected the correct answer, his disks 197 will have been adjusted to the same position as the disks 183 in the master control panel 181, and, therefore, the capacitors 195 will have the same total capacitance as the capacitors 186. Therefore, the tuned circuit in the student's unit will resonate at the frequency of the instructor's unit, and the energy will be transferred from the primary coil 196 through a secondary coil 199 to a relay 200. If the student has selected the correct answer, therefore, the relay 200 will operate and an indicator 201 in the student's module will indicate a correct answer. The indicator 201 may be an electric light or the like.

The invention is not limited to the slavish imitation of each and every one of the features set forth above. It is to be understood that, within the scope of the appended claims, the invention may be practiced otherwise than as specifically shown and described herein.

What is claimed is:

1. A teaching device comprising a master control panel and a student's module, the master control panel and the student's module each having a first frequency generating means, programming means on said master control panel for programming answers to questions and answer-selecting means on the student's module for selecting answers to questions, said programming and answer-selecting means being adjustable to any one of a series of positions to program and select an answer to a question, each of said first frequency generating means being respectively responsive to said programming means and said answer-selecting means to emit identical frequencies when said programming means and said answer-selecting means are similarly positioned to program and select identical answers, said master control panel having a second frequency generating means which emits a constant frequency signal, said master control panel having first frequency mixing means to mix the signal from its first frequency generating means and the signal from its second frequency generating means, means to filter the individual frequencies of the first and second frequency generating means from the mixed signal and to transmit only an algebraic sum of the signals from the first and second frequency generating means to a second frequency mixing means, said second frequency mixing means having means to mix the transmitted signal with the signal from the first frequency generating means in the student's module, and answer-indicating means responsive to the frequency of the second frequency generating means, whereby said answer-indicating means will operate only if the first frequency generating means emits identical signals.

2. A teaching device according to claim 1 wherein said answer-indicating means includes a tuned relay which operates in response to the frequency of the second frequency generating means.

3. A teaching device according to claim 1 wherein said answer-indicating means includes a filter which presents a high impedance to all frequencies except that frequency generated by the second frequency generating means and further includes a relay which is responsive to the signal passed by said filter.

4. A teaching device comprising a master control panel and a student's module, the master control panel having a frequency generating means, programming means on said master control panel having a plurality of unique settings for programming answers to questions, and answer-selecting means on the student's module having a plurality of settings each of which corresponds to one of the settings on the master control panel for selecting answers to questions, said programming means being adjustable to any one of its settings to program an answer to a question, said frequency generating means being responsive to each setting of said programming means to emit a unique frequency signal for each setting on said programming means when said programming means is positioned to program an answer, said student's module including a tuned circuit, the resonance of said tuned circuit being adjustable in response to said answer-selecting means, said tuned circuit resonating at the frequency of said frequency generating means when said programming means and said answer-selecting means are similarly positioned to program and select identical answers, and answer-indicating means responsive to the resonant frequency of said tuned circuit.

5. A teaching device according to claim 4 wherein said answer-indicating means is located in a display panel remote from said master control panel and said student's module.

6. A teaching device according to claim 4 wherein said tuned circuit includes a coil which is energized at the resonant frequency of said tuned circuit and said answer-indicating means includes switch means responsive to the energizing of said coil.

7. A teaching device according to claim 4 wherein said tuned circuit includes a primary coil which is energized at the resonant frequency of said circuit and said answer-indicating means includes a secondary coil which is energized by said primary coil.

8. A teaching device comprising a master control panel and a student's module, the master control panel having a frequency generating means, programming means on said master control panel for programming answers to questions and answer-selecting means on the student's module for selecting answers to questions, said programming means being adjustable to any one of a series of positions to program an answer to a question, said frequency generating means being responsive to said programming means to emit a signal when said programming means is positioned to program an answer, said student's module including a tuned circuit, the resonance of said tuned circuit being adjustable in response to said answer-selecting means, said tuned circuit resonating at the frequency of said frequency-generating means when said programming means and said answer-selecting means are similarly positioned to program and select identical answers, answer-indicating means responsive to the frequency of said tuned circuit, said tuned circuit including a coil which is energized at the resonant frequency of said tuned circuit and said answer-indicating means including switch means responsive to the energizing of said coil.

9. A teaching device comprising a master control panel and a student's module, the master control panel and the student's module each having a first frequency generating means, programming means on said master control panel for programming answers to questions and answer-selecting means on the student's module for selecting answers to questions, said programming and answer-selecting means being adjustable to any one of a series of positions to program and select an answer to a question, each of said first frequency generating means being respectively responsive to said programming means and said answer-selecting means to emit cancelling frequency signals when said programming means and said answer-selecting means are similarly positioned to program and select identical answers, said master control panel having a second frequency generating means which emits a constant frequency signal, said master control panel having first frequency mixing means to mix the signal from its first frequency generating means and the signal from its second frequency generating means, means to filter the individual frequencies of the first and second frequency generating means from the mixed signal and to transmit only an algebraic sum of the signals from the first and second frequency generating means to a second frequency mixing means, said second frequency mixing means having means to mix the transmitted signal with the signal from the first frequency generating means in the student's module, and answer-indicating means responsive only to the frequency of the second frequency generating means, whereby said answer-indicating means will operate only if the first frequency generating means emits cancelling signals.

References Cited
UNITED STATES PATENTS

| | | | |
|---|---|---|---|
| 2,793,446 | 5/1957 | Childs | 35—48 |
| 3,095,653 | 7/1963 | Corrigan | 35—9 |
| 3,113,312 | 12/1963 | Begeman | 35—10.4 X |
| 3,209,351 | 9/1965 | Davis | 343—6.5 |
| 3,273,260 | 9/1966 | Walker | 35—9 |
| 3,281,835 | 10/1966 | Reynders | 343—6.5 X |

EUGENE R. CAPOZIO, *Primary Examiner.*

R. W. WEIG, *Assistant Examiner.*